(12) United States Patent
Krupnick

(10) Patent No.: US 7,836,651 B2
(45) Date of Patent: Nov. 23, 2010

(54) TILE ASSEMBLY SYSTEM

(76) Inventor: William N. Krupnick, Eldo Building, 12 Shifang Road, Building 10-36B, Shijazhuang 050041, Hebei (CN)

( * ) Notice: Subject to any disclaimer, the term of this patent is extended or adjusted under 35 U.S.C. 154(b) by 0 days.

(21) Appl. No.: 11/676,083

(22) Filed: Feb. 16, 2007

(65) Prior Publication Data
US 2007/0193133 A1 Aug. 23, 2007

Related U.S. Application Data

(60) Provisional application No. 60/774,992, filed on Feb. 16, 2006.

(51) Int. Cl.
*E04F 13/08* (2006.01)
(52) U.S. Cl. .......................... 52/392; 52/311.1; 52/315; 52/384; 52/390
(58) Field of Classification Search .................. 52/384, 52/390, 392, 177, 796.1, 480, 578, 311.1, 52/315; 428/33, 44, 15, 68; 523/219, 171
See application file for complete search history.

(56) References Cited

U.S. PATENT DOCUMENTS

| | | | | |
|---|---|---|---|---|
| 2,006,635 A | * | 7/1935 | Farr | 52/314 |
| 2,154,590 A | * | 4/1939 | Vokes | 52/206 |
| 2,923,372 A | * | 2/1960 | MacCaferri | 181/284 |
| 3,278,662 A | * | 10/1966 | Mangrum | 264/77 |
| 4,008,548 A | * | 2/1977 | Leclerc | 52/180 |
| 4,584,221 A | * | 4/1986 | Kung | 428/44 |
| 4,930,286 A | * | 6/1990 | Kotler | 52/177 |
| 5,028,459 A | * | 7/1991 | Lathrop | 428/15 |
| 5,323,575 A | * | 6/1994 | Yeh | 52/177 |
| 5,509,244 A | * | 4/1996 | Bentzon | 52/387 |
| 5,758,463 A | * | 6/1998 | Mancini, Jr. | 52/309.12 |
| 6,387,985 B1 | * | 5/2002 | Wilkinson et al. | 523/171 |
| 6,467,224 B1 | | 10/2002 | Bertolini | |
| 6,698,149 B1 | * | 3/2004 | Ruchgy | 52/309.4 |
| 6,804,923 B1 | | 10/2004 | Potter | |
| D499,189 S | * | 11/2004 | Collison | D25/62 |

(Continued)

FOREIGN PATENT DOCUMENTS

JP  04-064660 A  2/1992

(Continued)

OTHER PUBLICATIONS

KIPO; International Search Report, PCT/US2007/062345; Korean Intellectual Property Office, Jun. 25, 2007.

*Primary Examiner*—Brian E Glessner
*Assistant Examiner*—Patrick Maestri
(74) *Attorney, Agent, or Firm*—Carr LLP

(57) ABSTRACT

The present invention provides a tile panel unit having a tile cap composed of at least one layer of crushed stone mixed with a resin and a catalyst and at least one layer of fiberglass strands mixed with a resin, and a base plate at least partially embedded in at least one layer of the tile cap material. The base plate provides a structure for supporting the tile cap, the structure having a matrix of supporting shapes and other reinforcing elements arranged within a peripheral support structure. The base plate further provides mounting features for securing the tile panel unit to an underlying support structure, and interlocking features for aligning and securing adjacent tile panel units in a wall and floor covering tile assembly system.

29 Claims, 16 Drawing Sheets

U.S. PATENT DOCUMENTS

| | | |
|---|---|---|
| 6,941,715 B2 | 9/2005 | Potter |
| 7,162,838 B2 * | 1/2007 | Ardern ................... 52/127.9 |
| 7,371,441 B2 * | 5/2008 | Sakai et al. ................. 428/15 |
| 2002/0189176 A1 * | 12/2002 | Stegner et al. ............... 52/177 |
| 2004/0226242 A1 * | 11/2004 | Moller, Jr. .................. 52/384 |
| 2004/0258869 A1 * | 12/2004 | Walker ...................... 428/44 |
| 2006/0127609 A1 * | 6/2006 | Davies et al. ................ 428/15 |
| 2006/0265975 A1 * | 11/2006 | Geffe ........................ 52/177 |
| 2007/0003791 A1 * | 1/2007 | Rochette .................... 428/703 |

FOREIGN PATENT DOCUMENTS

| | | |
|---|---|---|
| JP | 2005-16174 A | 1/2005 |
| JP | 2005-113671 A | 4/2005 |

* cited by examiner

| 200 | 200 | 200 | 200 | 200 | 200 | 300 |
| 300 | 200 | 200 | 200 | 200 | 200 | 200 |
| 200 | 200 | 200 | 200 | 200 | 200 | 300 |
| 300 | 200 | 200 | 200 | 200 | 200 | 200 |
| 200 | 200 | 200 | 200 | 200 | 200 | 300 |

TILE ASSEMBLY SYSTEM

CROSS-REFERENCED APPLICATIONS

This application relates to, and claims the benefit of the filing date of, co-pending U.S. provisional patent application Ser. No. 60/774,992 entitled TILE ASSEMBLY SYSTEM, filed Feb. 16, 2006, the entire contents of which are incorporated herein by reference for all purposes.

BACKGROUND OF THE INVENTION

1. Field of the Invention

The present invention relates to modular building products and, more particularly, to modular tile assemblies for use as flooring and/or wall coverings.

2. Description of the Related Art

Stone and ceramic tile has long been used in building construction as floor and wall coverings, and for deck construction. Such tile requires a substantial supporting structure, especially for floor covering and deck construction, to support the weight of the tiles and provide a substantially flat surface to support the tiles and minimize cracking or other damage. Traditionally, floor and wall tiles are set individually using mortar or other adhesive and, once the mortar or adhesive sets, gaps between the tiles are filled with grout. The traditional process of laying tile is time-consuming and labor intensive, requiring substantial time for setting and curing the mortar and installing the grout. Depending upon the tile material, the completed floor may also require finishing with a moisture-resistant coating to seal the grout and protect the tile surface. A need therefore exists for a tile assembly system that can easily be installed over a minimal supporting structure, directly over floor joists, or on walls.

SUMMARY OF THE INVENTION

The present invention provides a tile panel unit having a tile portion and mounting members for securing the tile panel unit to an underlying support structure and for aligning and joining adjacent tile panel units in a tile assembly system.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

The entire contents of U.S. provisional patent application Ser. No. 60/774,992 entitled TILE ASSEMBLY SYSTEM, filed Feb. 16, 2006, are incorporated herein by reference for all purposes. In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning known materials, molding processes, and the like, have been omitted inasmuch as such details are not considered necessary to obtain a complete understanding of the present invention, and are considered to be within the understanding of persons of ordinary skill in the relevant art.

Figure 1:
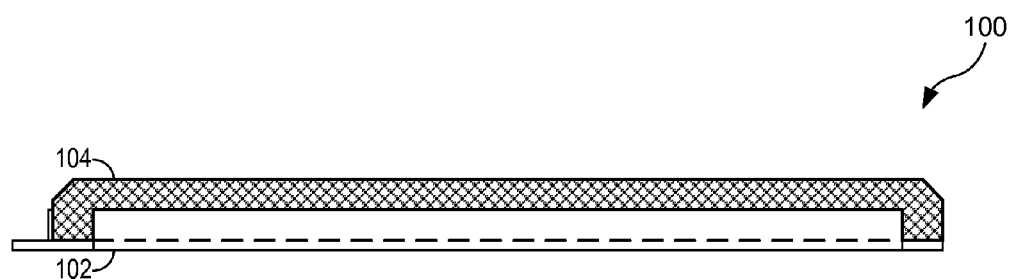
FIG. 1 is a cross sectional view of a tile unit embodying features of the present invention.

Turning now to FIG. 1, the reference numeral 100 generally indicates a tile panel unit according to one embodiment of the present invention. The tile panel unit 100 generally comprises a base plate 102 partially embedded in a surface material tile cap 104. The base plate 102 can be an injection-molded thermosetting plastic material such as high-density polyethylene (HDPE), or polypropylene (PP), with fiberglass reinforcing and formed into a desired shape. The base plate 102 can be placed on a cooling fixture to maintain critical dimensions as the hot plastic coming out of the mold cools and tends to shrink and warp. The cooling fixture immobilizes or maintains those features having critical dimensions until the plastic is cool enough not to shrink or warp. The surface material tile cap 104 can be a composite material, a mixture primarily of crushed stone, a resin, and fiberglass, molded into a desired shape.

Figure 2:
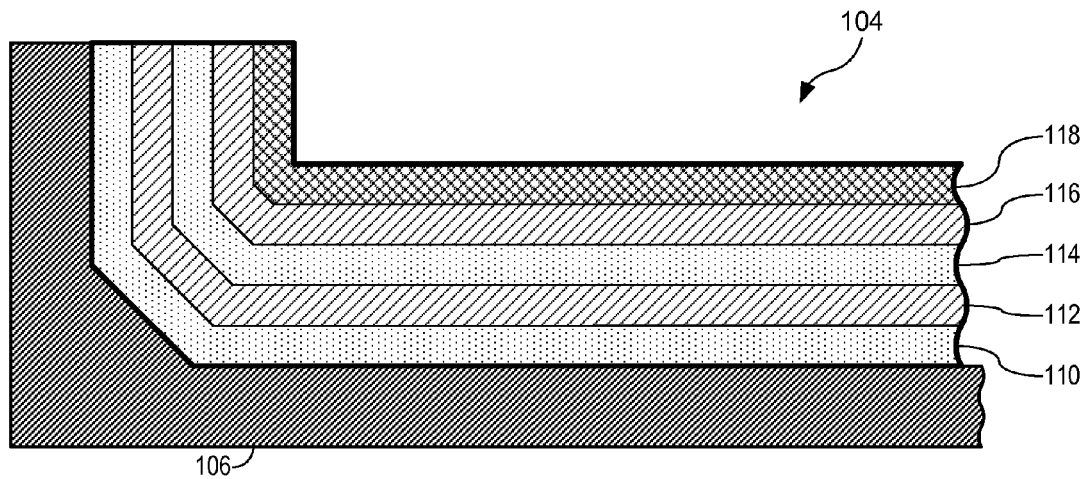
FIG. 2 is a pictorial representation of a surface material tile cap in cross section showing layered construction thereof.

To form the surface material tile cap 104 of an embodiment of the tile panel unit 100, crushed stone can be mixed with a resin such as a polyester, acrylic or epoxy resin, or other such resins, and a catalyst such as MEKP or another peroxide based catalyst, until a substantially uniform stone-resin mixture is obtained. With reference to FIG. 2, The stone-resin mixture is then applied in phixotropic layering to a mold 106 having a textured surface resembling stone or other textures as desired. A mixture of fiberglass chopped strand mat and a resin can be prepared, preferably using the same resin and catalyst used in the stone-resin mixture, to form a fiberglass-resin mixture. The stone-resin mixture and fiberglass-resin mixture can be applied in relatively thin layers, preferably at least two layers, such as a first stone-resin layer 110 and a first fiberglass-resin layer 112, with each successive layer applied prior to complete curing of the previous layer. Preferably, one or more successive layers of stone-resin mixture and fiberglass-resin mixture, such as a second stone-resin layer 114 and a second fiberglass-resin layer 116, are applied over the previous layers 110, 112, with the first such layer 114 being applied prior to complete curing of the previous layer 112, and each subsequent layer being applied before complete curing of the previous layer. The last layer 118 applied is preferably a mixture of the stone-resin mixture and chopped fiberglass strands.

To complete fabrication of the tile panel unit 100, and prior to complete curing of the layers of stone-resin mixture and fiberglass-resin mixture in the mold, a base plate, such as the base plate 102, is pressed into the mold to embed the base plate 102 into the surface material tile cap 104. A positioning fixture may be used to aid in accurate and precise placement of the base plate 102 into the surface material tile cap 104. Once removed from the mold, the surface material tile cap 104 of the tile unit 100 can be coated with one or more applications of water-resistant coatings to protect the surface material tile cap 104 from being stained by liquids spilled onto the surface.

Base Plate

Turning now to FIG. 3, one embodiment of the base plate 102 comprises an injection-molded, fiberglass-reinforced plastic matrix having a number of particularly useful features, as will be described hereinafter. The exemplary base plate 102 shown in FIG. 3 is generally square, although other shapes, such as rectangles and the like, or free-form shapes, can be used depending upon the desired shape of the finished tile unit. Particular dimensions of the base plate 102 may also vary depending upon the desired application of the finished tile unit. For example, some embodiments can have a relatively thicker base plate imparting more structural strength to the tile unit, while other embodiments can have a relatively thinner base plate to create tile units to be used as an overlay on a pre-existing structural support floor or deck. As shown in a top view in FIG. 3A, the exemplary base plate 102 comprises vertical peripheral walls 130 interconnected at corner junctions thereof. Within peripheral walls 130 is formed a matrix of structural reinforcing shapes, shown in FIG. 3A as a matrix of hexagonal shapes, although other shapes may be used as desired.

Figure 3A:
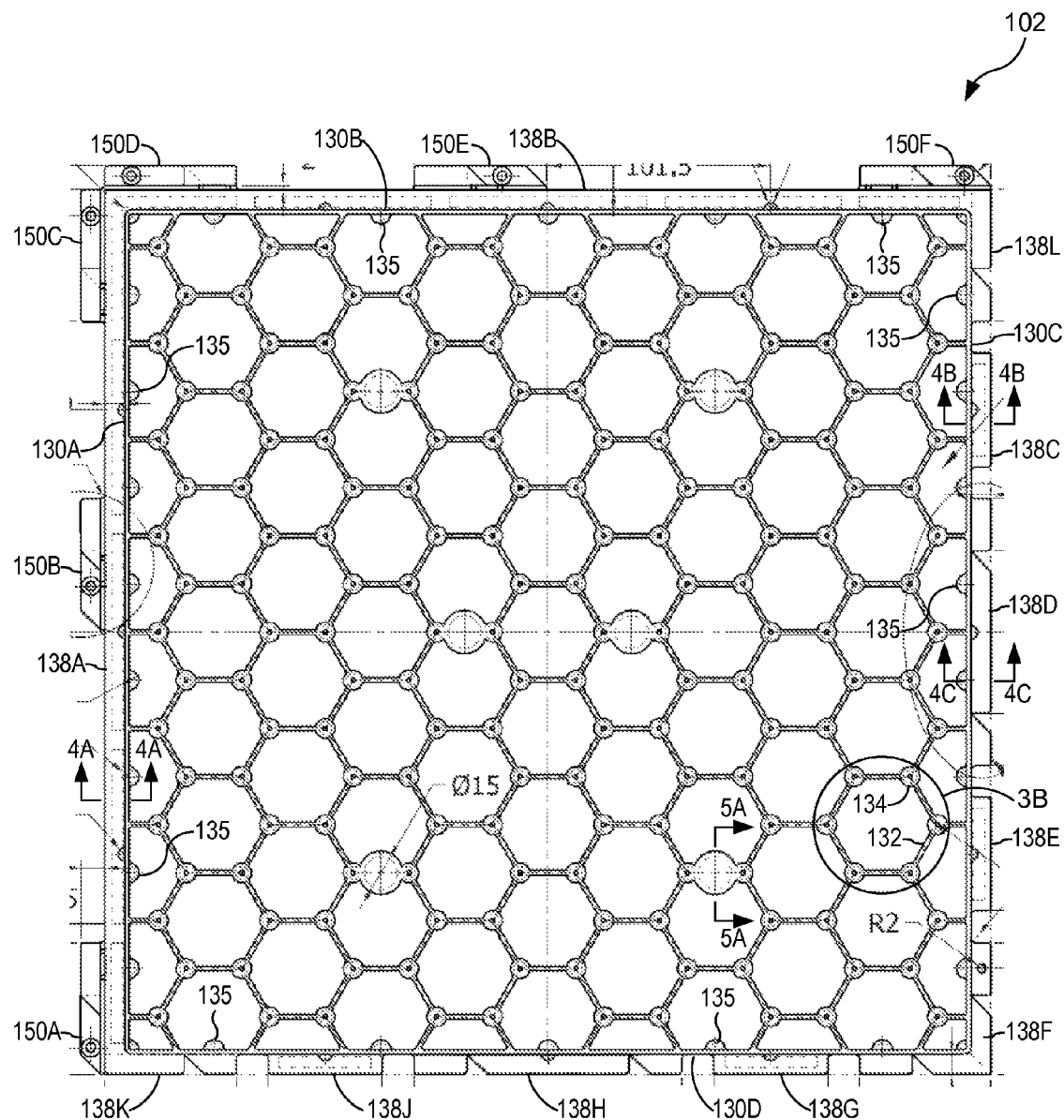
FIG. 3A is a top plan view of a base plate embodying features of an exemplary embodiment.
Figure 3B:
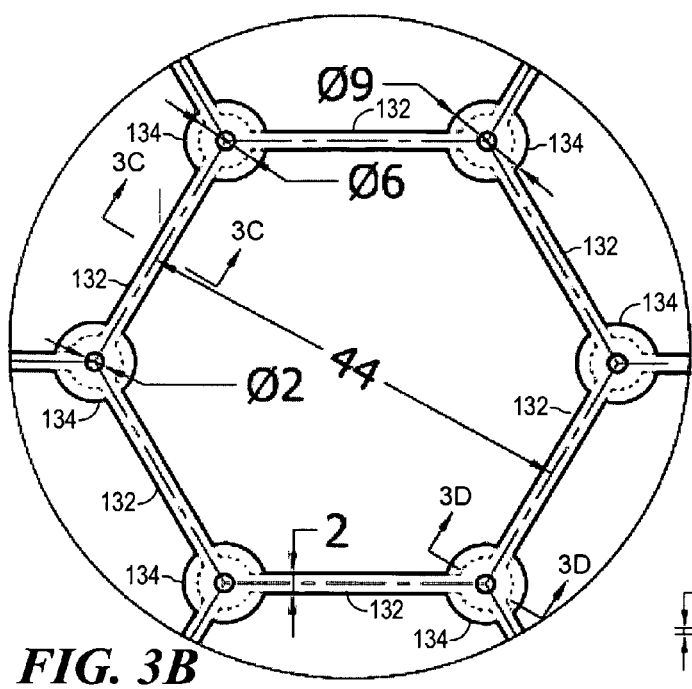
FIG. 3B is a detail plan view of a supporting structure of the base plate.
Figure 3C:
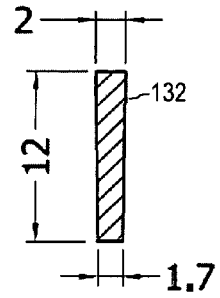
FIG. 3C is a cross-sectional view of a supporting member of the supporting structure.
Figure 3D:
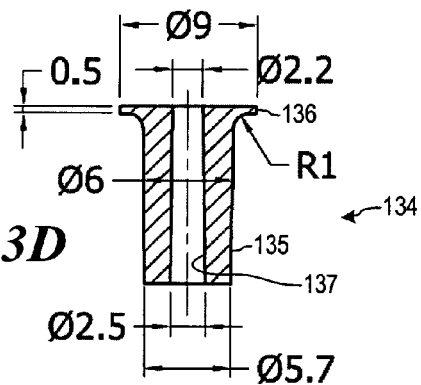
FIG. 3D is a cross-sectional view of another supporting member of the supporting structure.

Referring now to FIG. 3B-3D, the structural reinforcing shapes can comprise a number of vertical wall segments 132 interconnecting at vertical column segments 134 formed at junctions of the vertical wall segments. FIG. 3B illustrates a detail view of a cluster of vertical wall segments 132 intersecting vertical column segments 134. In the hexagonal shape shown in FIG. 3A-3B, three vertical wall segments 132 intersect one vertical column segment 134, wherein intersections are separated by an angle of 120 degrees from adjacent intersections. FIG. 3C is a cross-sectional view of a vertical wall segment 132 taken along the lines 3C-3C in FIG. 3B, and illustrates a generally rectangular cross-section having a slight draft or taper towards a bottom end thereof. FIG. 3D is a cross-sectional view of a vertical column segment 134 taken along the lines 3D-3D in FIG. 3B, and illustrates a generally cylindrical portion 135 having an enlarged circular boss 136 at the top of the vertical column segment 134. A vertical bore 137 is preferably formed through the center of the vertical column segment 134. The generally cylindrical portion 135 preferably has a slight draft or taper towards the bottom thereof giving the vertical bore 137 a slight taper such that the vertical bore 137 is slightly larger at its bottom end. Each vertical column segment 134 forms a cylindrical boss having an attachment foot in the form of the circular boss 136, and is supported by at least three vertical wall segments 132 throughout the matrix of hexagonal reinforcing shapes. All of the components of the matrix of reinforcing shapes are preferably molded as a single unit together with the peripheral walls 130 and other features to be described hereinafter.

Figure 3E:
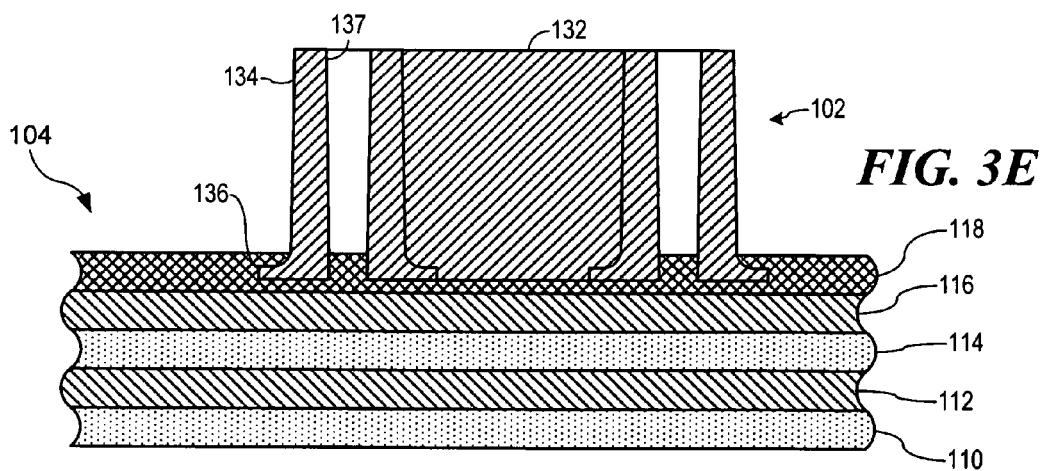
FIG. 3E is a cross-sectional view of supporting members of the supporting structure partially embedded in the surface material tile cap.

Referring back to FIG. 3A, a number of half-circle attachment feet 135 can extend inwardly from the tops of peripheral walls 130 of base plate 102. When a base plate 102 is pressed into the mold to embed the base plate 102 into the surface material tile cap 104, the base plate 102 is preferably embedded into at least the last layer 118 of surface material tile cap 104 applied to the mold and to a depth sufficient to surround and encapsulate attachment feet formed by the circular bosses 136 and the attachment feet 135 extending inwardly from peripheral walls 130, and to partially fill vertical bores 137 in vertical column segments 134, as shown in FIG. 3E, thereby capturing the base plate 102 to the surface material tile cap 104 once the layers of surface material tile cap 104 have cured. The surface material tile cap 104 preferably extends beyond the peripheral walls 130 of the base plate 102 and rests upon support flanges 138 integrally molded into the base plate 102. The surface material tile cap 104 is thereby effectively supported by the peripheral walls 130, the matrix of reinforcing shapes comprising vertical wall segments 132 and cylindrical bosses 134, and by the support flanges 138.

Support Flanges

Referring again to FIG. 3A, support flanges 138 can be formed in the exemplary injection-molded base plate 102 at certain locations beyond the extent of the peripheral walls 130. For example, a first support flange 138A extends outwardly from and along the length of peripheral wall 130A, and may extend around a corner formed at the intersection of peripheral wall 130A and peripheral wall 130D as the support flange portion 138K. Similarly, a second support flange 138B extends outwardly from and along the length of peripheral wall 130B, and may extend around a corner formed at the intersection of peripheral wall 130B and peripheral wall 130C as the support flange portion 138L. Additional support flange portions 138C, 138D, and 138E extend outwardly from and at certain locations along peripheral wall 130C. Another support flange portion extends outwardly from and around a corner formed by the intersection of peripheral walls 130C and 130D. Other support flanges 138G, 138H, and 138K extend outwardly from and at certain locations along peripheral wall 130D.

Figure 4A:
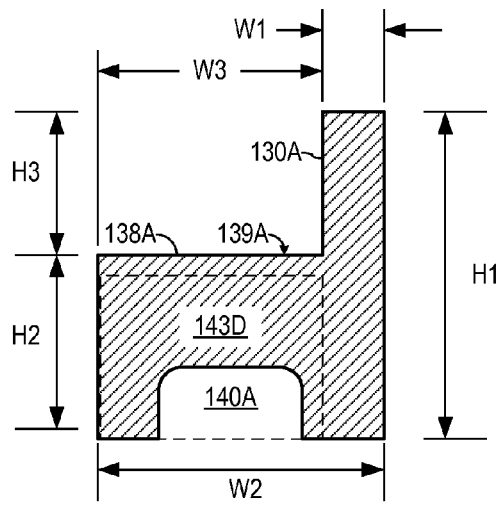
FIGS. 4A-4C are a cross-sectional views of peripheral supporting flanges of the base plate.

Referring now to FIG. 4A, a cross-sectional view taken along the lines 4A-4A in FIG. 3 illustrates the formation of support flange 138A extending outwardly from peripheral wall 130A. The peripheral wall 130A can have a nominal height H1 and a nominal width W1. Support flange 138A can have a top surface 139A located at a distance H2 above the bottom of peripheral wall 130A and at a distance H3 below the top of peripheral wall 130A. The support flange 138A together with the peripheral wall 130A can have a width W2 such that the top surface 139A of support flange 138A has a width W3 substantially equal to the difference between W2 and W1, or W3=W2−W1. The support flange 138A thereby accommodates surface material tile cap 104 extending a distance of W3 beyond the extent of peripheral walls 130 and extending down a distance of H3 to rest upon the surface 139A of the support flange 138A. A volume 143A below the top surface 139A of support flange 138A is substantially filled except for an open channel 140A, which is open to the bottom of support flange 138A for optionally receiving a construction adhesive, as will be described hereinafter.

Figure 4B:
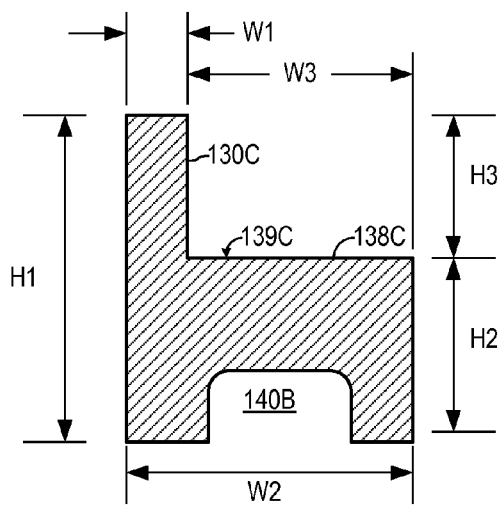

Referring again to FIG. 3A, support flanges 138B-138L are similar to support flange 138A in height and width, but the support flanges can vary in length to accommodate other features of the base plate 102 without compromising support of the surface material tile cap 104. For example, support flange 138C formed along a portion of the length of peripheral wall 130C, and as shown in cross-section in FIG. 4B, is dimensionally similar to support flange 138A in height and width, providing a top surface 139C that has a width W3 at a distance H3 below the top of the peripheral wall 130C. The support flange 138C thereby accommodates surface material tile cap 104 extending a distance of W3 beyond the extent of peripheral walls 130 and extending down a distance of H3 to rest upon the top surface 139C of the support flange 138C. Referring again to FIG. 3A, support flanges 138E, 138G, and 138J are dimensionally similar to support flange 138C in height and width, providing top surfaces 139 that have a width W3 at a distance H3 below the top of the corresponding peripheral wall 130. The support flanges 138E, 138 G, and 138J thereby accommodate surface material tile cap 104 extending a distance of W3 beyond the extent of peripheral walls 130 and extending down a distance of H3 to rest upon the top surfaces 139 of the support flanges 138E, 138G, and 138J.

Figure 4C:
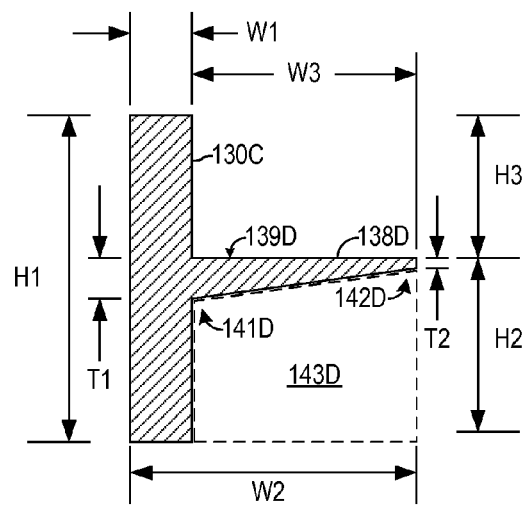

Referring again to FIG. 3A, support flanges 138D, 138F, 138H, 138K and 138L provide additional support for the surface material tile cap 104. For example, support flange 138D formed along a portion of the length of peripheral wall 130C, and as shown in cross-section in FIG. 4C, provides a top surface 139D that has a width W3 at a distance H3 below the top of the peripheral wall 130C. The support flange 138D has a nominal thickness T1 at a proximal end 141D where the flange joins the peripheral wall 130C, and tapers to a minimal thickness T2 at a distal end 142D. The support flange 138D thereby accommodates surface material tile cap 104 extending a distance of W3 beyond the extent of peripheral walls 130 and extending down a distance of H3 to rest upon the top surface 139D of the support flange 138D. A volume 143D below the support flange 138D is open to accommodate other features of the base plate 102 as will be described hereinafter. Referring again to FIG. 3A, support flanges 138F, 138H, 138K and 138L are dimensionally similar to support flange 138D in height and width, providing top surfaces 139 that have a width W3 at a distance H3 below the top of the corresponding peripheral wall 130. The support flanges 138F, 138H, 138K and 138L thereby accommodate surface material tile cap 104 extending a distance of W3 beyond the extent of peripheral walls 130 and extending down a distance of H3 to rest upon the top surfaces 139 of the support flanges 138F, 138H, 138K and 138L.

The foregoing has described features of the base plate 102 in conjunction with the surface material tile cap 104 to provide structural support for the surface material tile cap 104 of the tile unit 100. Additional features of the base plate 102 described are hereinafter related to installation of one or more of the tile unit 100 in a wall and flooring system. It should be appreciated that the tile unit 100 can be installed as a floor covering or as a wall covering. It should further be appreciated that two or more tile units are typically installed to cover a given area of floor space or wall space. Additional features of base plate 102 are therefore provided to facilitate installation and alignment of two or more of the tile unit 100.

Mounting Flanges

Referring again to FIG. 3A, mounting flanges 150 can be formed in the exemplary injection-molded base plate 102 at certain locations beyond the extent of the peripheral walls 130. For example, a first set of mounting flanges 150A, 150B, and 150C, extends outwardly from and along respective portions of the length of support flange 138A, which extends outwardly from peripheral wall 130A. A second set of mounting flanges 150D, 150E, and 150F extend outwardly from and along a respective portions of the length of support flange 138B, which extends outwardly from peripheral wall 130B.

Figure 5A:
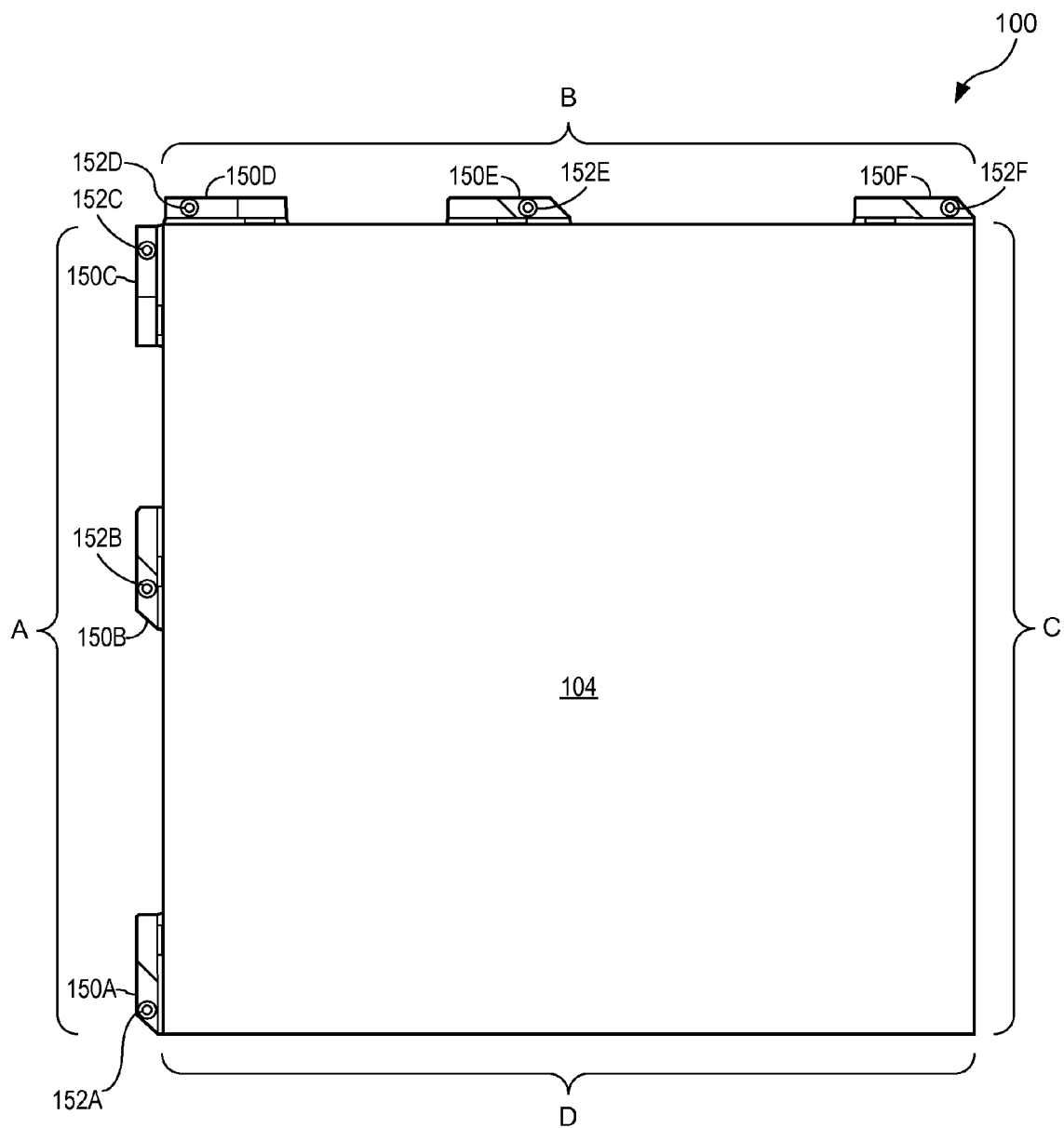
FIG. 5A is a plan view of a tile unit embodying features of the present invention.
Figure 5B:
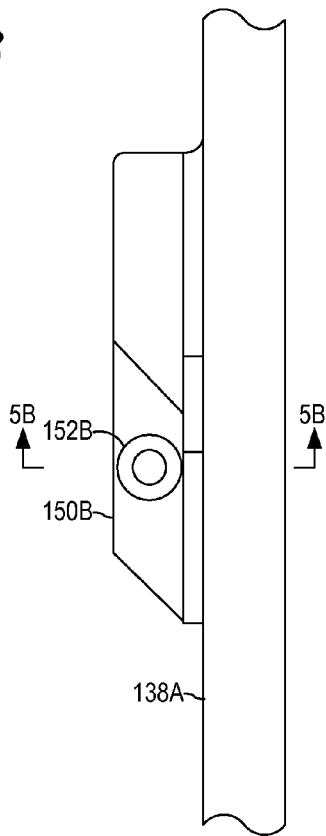
FIG. 5B is a detail view of a mounting flange of the base plate.
Figure 5C:
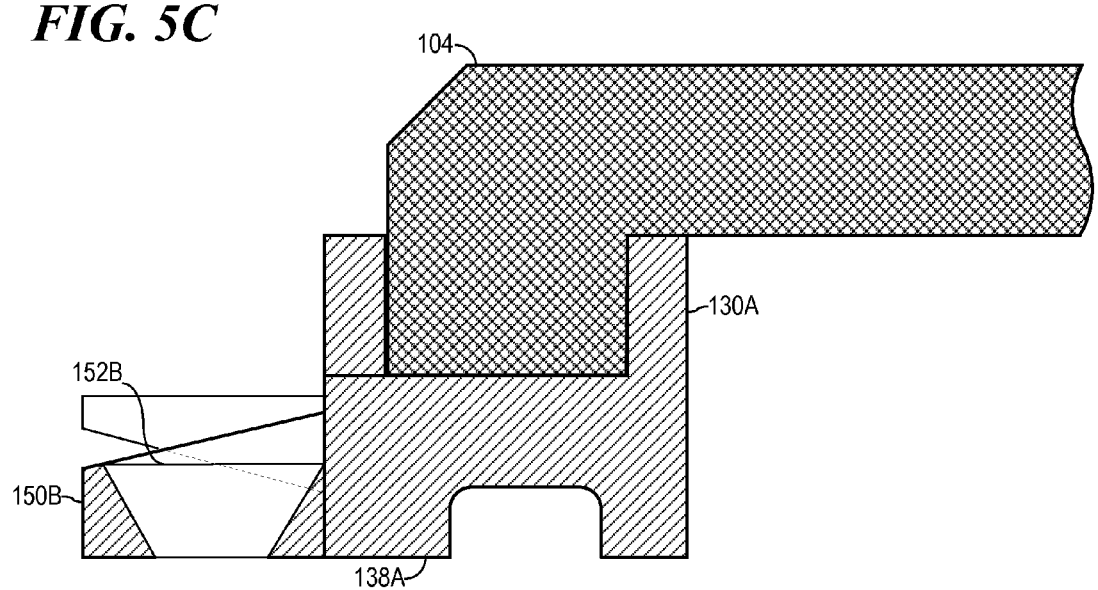
FIG. 5C is a cross-sectional view of a mounting flange of the base plate.

Referring now to FIG. 5A, tile unit 100 comprising the surface material tile cap 104 and base plate 102 is shown in top view in which most of the base plate 102 is below the tile cap 104 and cannot be seen. Mounting flanges 150 extend beyond the edges of the tile cap 104 along a Side A of the tile cap 104 and along a Side B of the tile cap 104. The mounting flanges can each be provided with a through-hole 152 for passing a mechanical fastener, such as a screw, a nail, or other fastener. Referring now to FIG. 5B and FIG. 5C, an exemplary mounting flange 150B extends outwardly from a portion of the length of support flange 138A, and beyond the extent of surface material tile cap 104. Edges 151 and 153 of mounting flanges 150 can be formed at an angle, diagonally, to facilitate alignment of adjacent tile units 100, as described below. Mounting flange 150B can be provided with a countersunk screw hole for receiving a flat-head screw or other similar fastener for securing the tile unit 100 to an underlying floor or wall structure. Referring back to FIG. 5A, the tile unit 100 can be secured to an underlying floor structure, or to a supporting wall structure, using for example, six fasteners such as flat-head screws or other similar fasteners, received in through-holes 152 of mounting flanges 150 as positioned along two adjacent sides of the tile unit 100.

Interlocking Features

Figure 6:
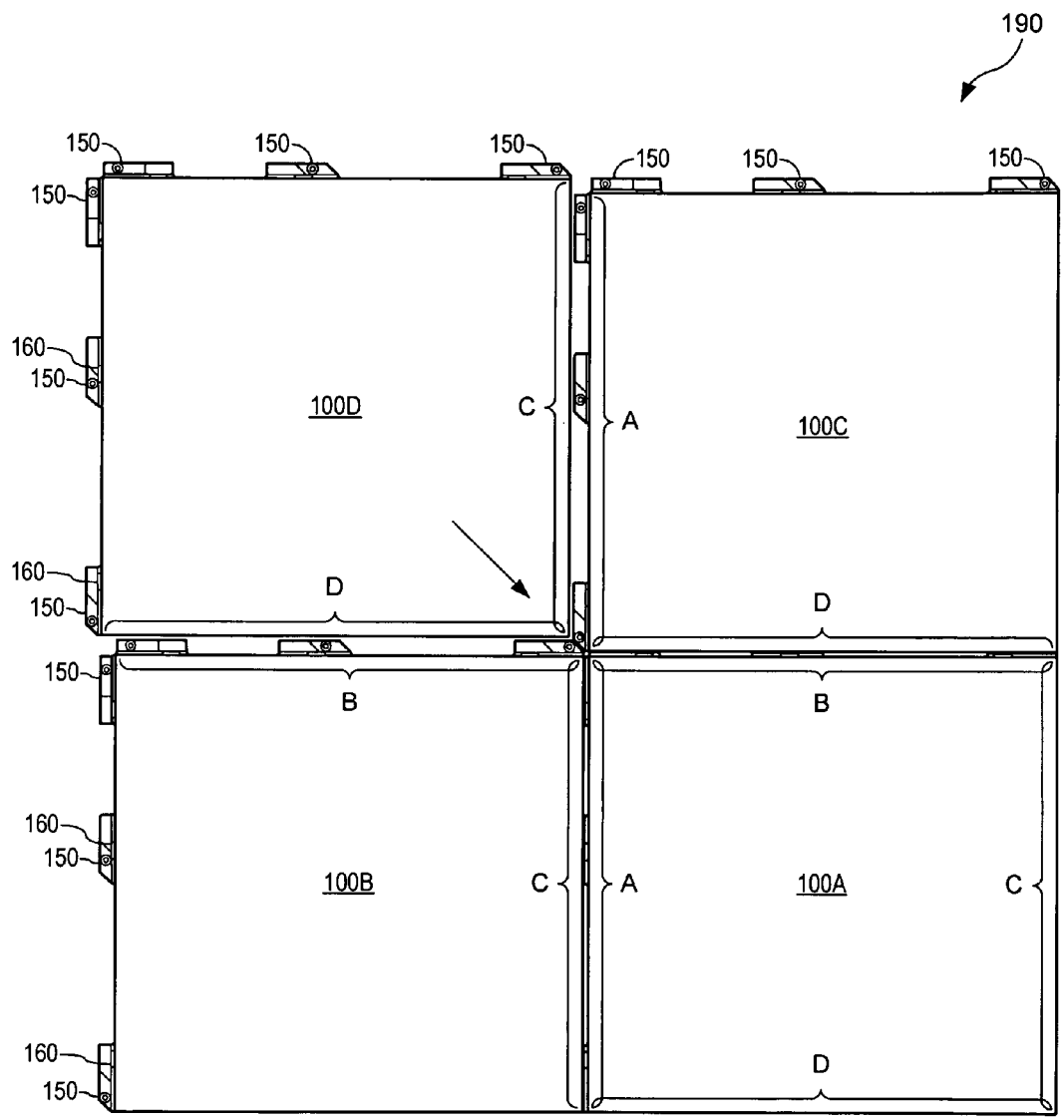
FIG. 6 is a plan view depicting installation of tile unit in a tile unit system.

Referring now to FIG. 6, an exemplary tile assembly system 190 can comprise a first tile unit 100A, a second tile unit 100B, a third tile unit 100C, a fourth tile unit 100D, and additional tile units as required. The first tile unit 100A should be oriented so that a corner of the tile unit 100A between side C and side D of thereof is placed in an outside corner of the area to be tiled. The first tile unit 100A can then be secured to a supporting structure, such as a floor or wall supporting structure, at mounting flanges 150 as described above. The second tile unit 100B can be positioned adjacent to the first tile unit 100A and aligned so that side C of the second tile unit 100B is adjacent to side A of the first tile unit 100A. The third tile unit 100C can be positioned adjacent the first tile unit 100A and aligned so that side D of the third tile unit 100C is adjacent to side B of the first tile unit 100A. The second tile unit 100B and the third tile unit 100C can be secured to the supporting structure at their respective mounting flanges 150 as described above. The fourth tile unit 100D as shown in FIG. 6 can be positioned adjacent the second tile unit 100B and the third tile unit 100C and aligned so that side D of the fourth tile unit 100D is adjacent side B of the second tile unit 100B, and so that side C of the fourth tile unit 100D is adjacent side A of the third tile unit 100C. The diagonally-formed edges 151, 153 of mounting flanges 150, in cooperation with interlocking elements along side C and side D of tile units 100, described below, ease placement of fourth tile unit 100D in a corner formed between second and third tile units 100B -100C. Once the fourth tile unit 100D is in position adjacent to second and third tile units 100B -100C, the fourth tile unit 1 OOD can be secured to the supporting structure at the respective mounting flanges 150 of the fourth tile unit 100D. Additional tile units can subsequently be installed in a similar way, positioning each additional tile unit adjacent to a previously installed tile unit, aligning side C of an additional tile unit with side A of a previous tile unit, or aligning side D of an additional tile unit with side B of a previous tile unit, and securing the additional tile unit to a support structure prior to installing yet another additional tile unit.

Figure 7:
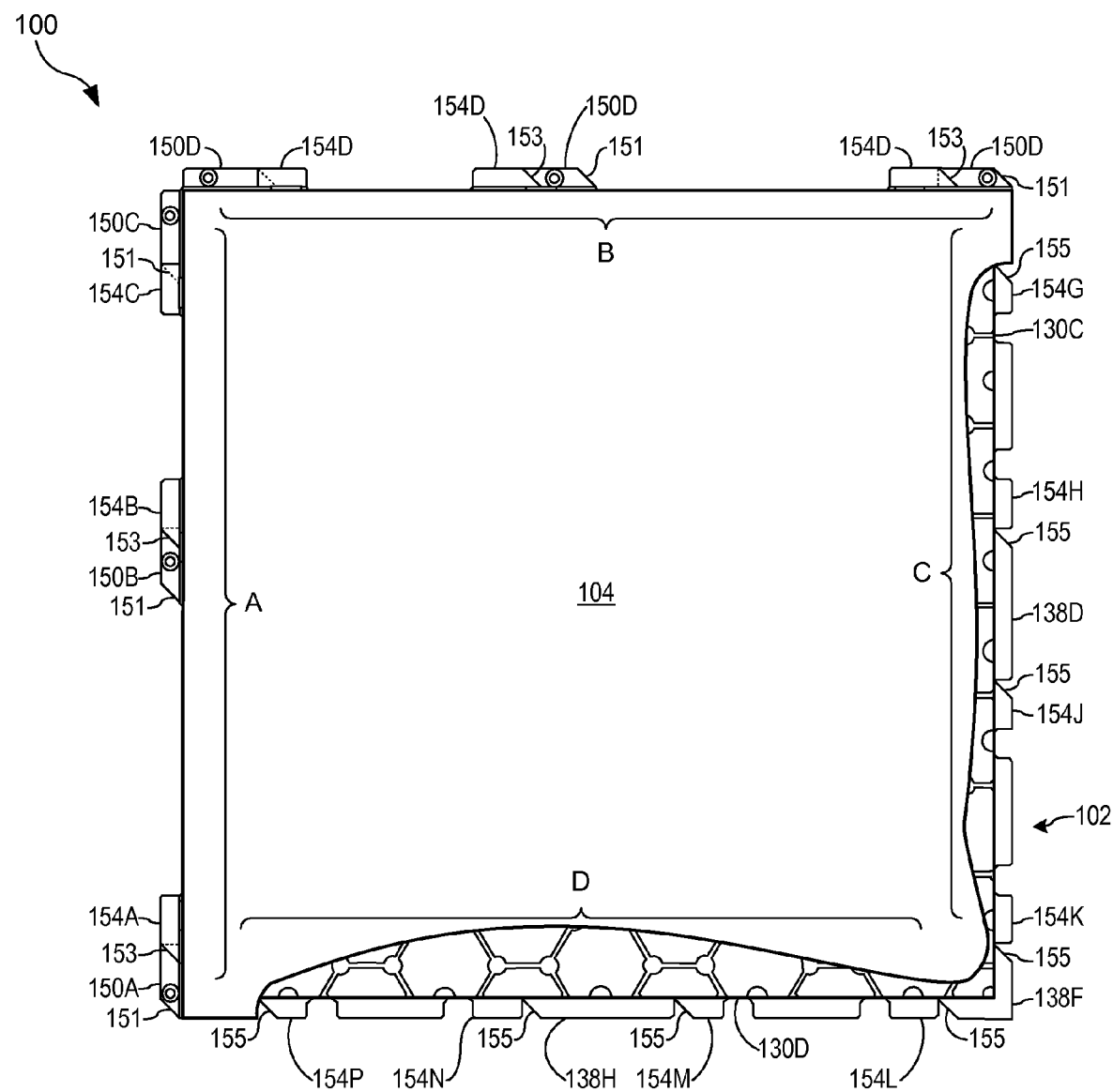
FIG. 7 is a plan view of a tile unit in partial cutaway depicting interlocking elements of the present invention.

Referring now to FIG. 7, a tile unit 100 is shown with the surface material tile cap 104 partially cut away to reveal interlocking elements 154 of the base plate 102. Adjacent to mounting flange 150A is interlocking tab 154A. Adjacent to mounting flange 150B is interlocking tab 154B. Adjacent to mounting flange 150C is interlocking tab 154C. Disposed along side A of the tile unit 100, interlocking tabs 154A-154C extend beyond the extent of the surface material tile cap 104 so as to fit under a surface material tile cap 104 of an adjacent tile unit 100, and to interlock with corresponding interlocking elements along side C of the adjacent tile unit. Adjacent to mounting flanges 150D-150F are interlocking tabs 154D-154F, respectively. Disposed along side B of the tile unit 100, interlocking tabs 154D-154F extend beyond the extent of the surface material tile cap 104 so as to fit under a surface material tile cap 104 of an adjacent tile unit 100, and to interlock with corresponding interlocking elements along side D of the adjacent tile unit. Disposed along side C of the tile unit, interlocking tabs 154G, 154H, 154J, 154K and interlocking support flange 138D extend outwardly from peripheral wall 130C but not farther than the extent of the surface material tile cap 104. Disposed along side D of the tile unit 100, interlocking tabs 154L, 154M, 154N, 154P, and interlocking support flange 138H extend outwardly from peripheral wall 130D but not farther than the extent of the surface material tile cap 104. Certain of the interlocking elements 154, for example, interlocking tabs 154G, 154J, 154M, 154P, and interlocking support flanges 138D, 138F, 138H, have at least one diagonally-formed edge 155 to cooperate with diagonally-formed edges 151, 153 of mounting flanges 150 on adjacent tile units 100. Interlocking tabs 154 and mounting flanges 150 of a first tile unit 100 cooperate with interlocking tabs 154 and mounting flanges of second and subsequent tile units 100 to facilitate proper alignment of adjacent tile units and help to secure subsequent tile units to an underlying support structure.

Figure 8A:
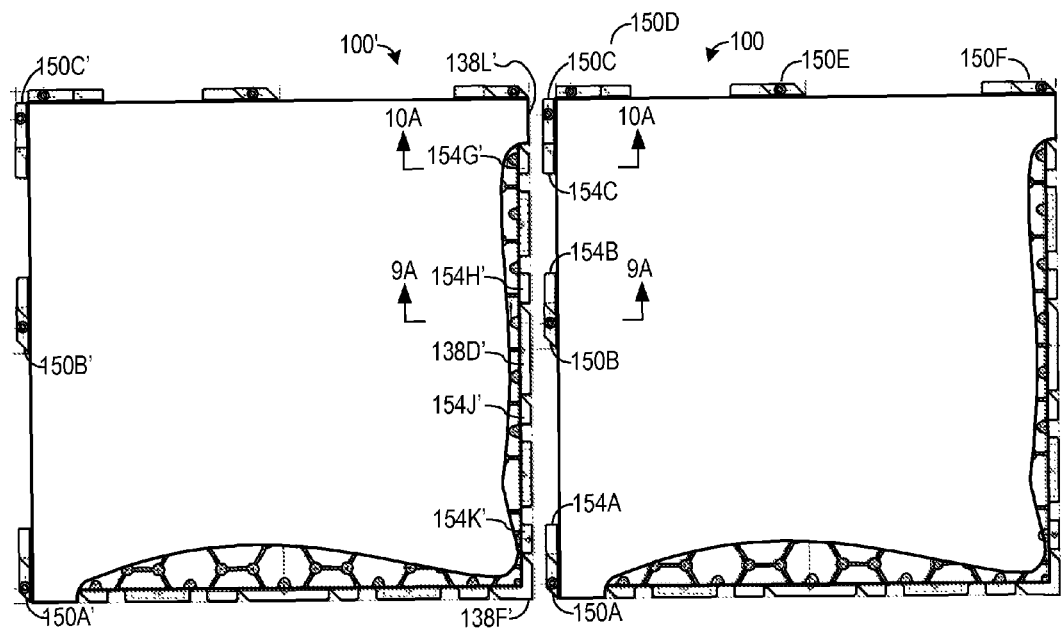
FIGS. 8A-8B are a plan views of two tile units in partial cutaway, depicting interlocking elements.
Figure 8B:
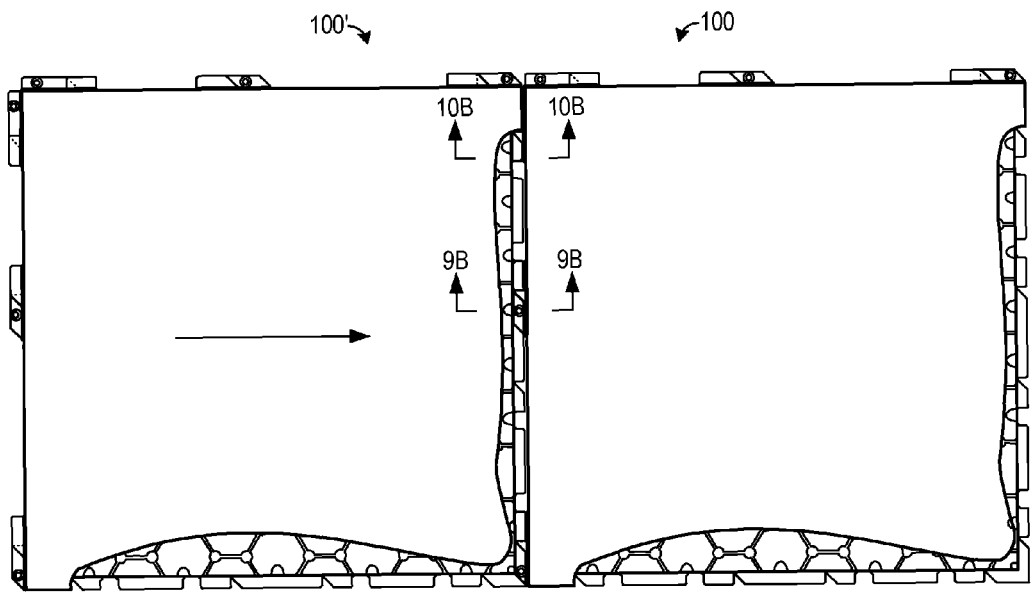

Turning now to FIG. 8, a first tile unit 100 is shown adjacent to a second tile unit 100' for the purpose of illustrating interlocking elements for positioning adjacent tile units 100 in a floor or wall tile assembly system. The first tile unit 100 can be installed on and secured to an underlying support structure, such as a sub floor, floor joists, or an unfinished wall, using fasteners through mounting holes in mounting flanges 150 as described above. The second tile unit 100' can be positioned adjacent the first tile unit 100 as described above with reference to FIG. 6. To facilitate alignment of adjacent tile units 100, interlocking elements disposed along the adjacent sides of the adjacent tile units fit over or under each other as shown and described hereinafter. For example, mounting flange 150A disposed along a portion of side A of the first tile unit 100 can fit under a portion of support flange 138F' disposed along a portion of side C of second tile unit 100'. Interlocking tab 154A disposed along a portion of side A of first tile unit 100 can fit over interlocking tab 154K' disposed along a portion of side C of second tile unit 100'. Mounting flange 150B along side A of the first tile unit 100 can fit under a portion of interlocking tab 138D' disposed along side C of second tile unit 100'. Interlocking tab 154B disposed along a portion of side A of first tile unit 100 can fit over interlocking tab 154H' disposed along side C of second tile unit 100'. Mounting flange 150C along side A of the first tile unit 100 can fit under a portion of support flange 138L' disposed along side C of second tile unit 100'. Interlocking tab 154C disposed along a portion of side A of first tile unit 100 can fit over interlocking tab 154G' disposed along side C of second tile unit 100'. The interlocking elements disposed along side A of first tile unit 100 and the interlocking elements disposed along side C of second tile unit 100' fit over and under each other to secure side C of second tile unit 100' to side A of first tile unit 100. Since first tile unit 100 can be secured to an underlying support structure at mounting flanges 150A-150C disposed along side A of first tile unit 100, side C of the second tile unit can be effectively secured to the underlying support structure by coupling the interlocking elements disposed along adjacent sides A and C of adjacent tile units 100 and 100', respectively. The second tile unit 100' can then be secured along side A thereof using fasteners through mounting flanges 150A'-150C' as described above with respect to first tile unit 100. Similar interlocking elements along sides B and D of the tile units 100 fit over and under each other to secure a side D of one tile unit 100 to a side B of an adjacent tile unit, wherein the side B of the adjacent tile unit can be secured to an underlying support structure at mounting flanges 150D-150F disposed along the side B, and the side D can be effectively secured to the underlying support structure by coupling the interlocking elements disposed along adjacent sides B and D of adjacent tile units 100.

Figure 9A:
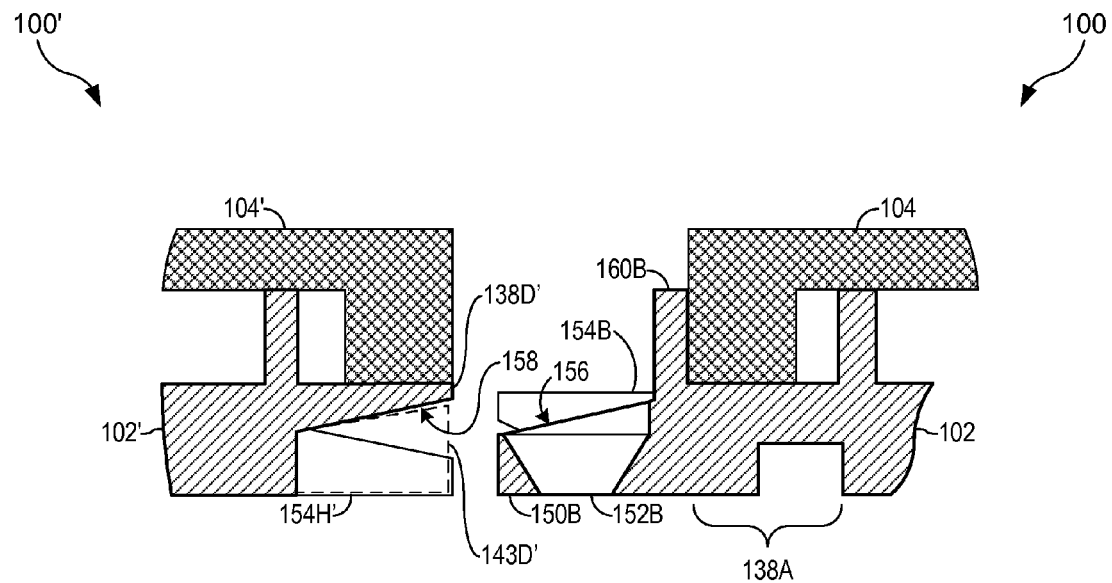
FIGS. 9A-9B are cross-sectional views of interlocking elements.
Figure 9B:
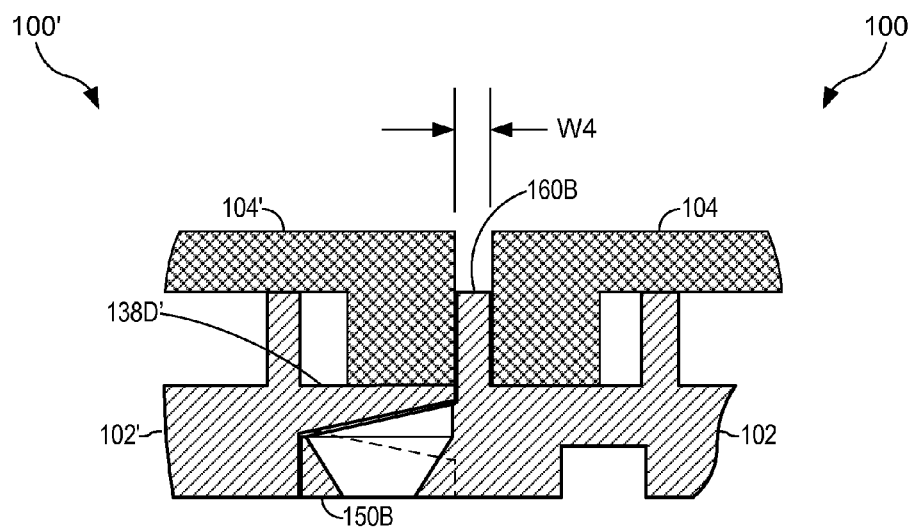

Turning now to FIG. 9A-9B, a sectional view taken along the lines 9-9 in FIG. 8 depicts mounting flanges 150B and interlocking tab 154B of first tile unit 100 adjacent to interlocking support flange 138D' and interlocking tab 154H' of second tile unit 100'. The cross-sectional view is taken through the center of mounting hole 152B in mounting flange 150B, and depicts mounting flange 150B having an upper surface 156 that slopes downward as the mounting flange 150B extends outwardly from base plate 102. Interlocking support flange 138D' on base plate 102' of the second tile unit 100' has a lower surface 158 that slopes upwardly as the interlocking support flange 138D'extends outwardly from base plate 102'. A volume 143D' below interlocking support flange 138D' is open to accommodate mounting flange 150B beneath interlocking support flange 138D' as tile unit 100' is aligned adjacent to tile unit 100. Similarly, interlocking tab 154B of tile unit 100 has a lower surface that slopes upwardly as the interlocking tab 154B extends outwardly from base plate 102, and interlocking tab 154H' of tile unit 100' has an upper surface that slopes downwardly as the interlocking tab 154H' extends outwardly from base plate 102'. As shown in FIG. 9B, tile unit 100' having surface material tile cap 104' atop base plate 102' can be positioned adjacent to and substantially in contact with tile unit 100 having surface material tile cap 104 atop base plate 102, such that interlocking support flange 138D' of base plate 102' can fit over mounting flange 150B of base plate 102, thereby concealing any fastener installed through mounting hole 152B, and interlocking flange 154B of base plate 102 can fit over interlocking flange 154H' of base plate 102', thereby securing side C of tile unit 100' to side A of tile unit 100.

As shown in FIG. 9A-9B, the base plate 102 can have a spacer 160 formed integrally therein and extending upwardly from a location beyond the extent of surface material tile cap 104 and between support flange 138A and mounting flange 150B. The spacer 160 effectively limits the proximity of surface material tile cap 104' to surface material tile cap 104. A drainage gap having a width W4 can be maintained between the surface material tile caps 104, 104' of adjacent tile units 100, 100' to permit water or other liquids or debris to drain between adjacent tile caps. The gap W4 can be approximately equal to the width W1 of peripheral wall 130, as illustrated in FIG. 4A-4C. Spacers 160 can be located in a number of places along side A and along side B of the tile units 100 to maintain drainage gaps between any two or more adjacent tile units 100.

Figure 10A:
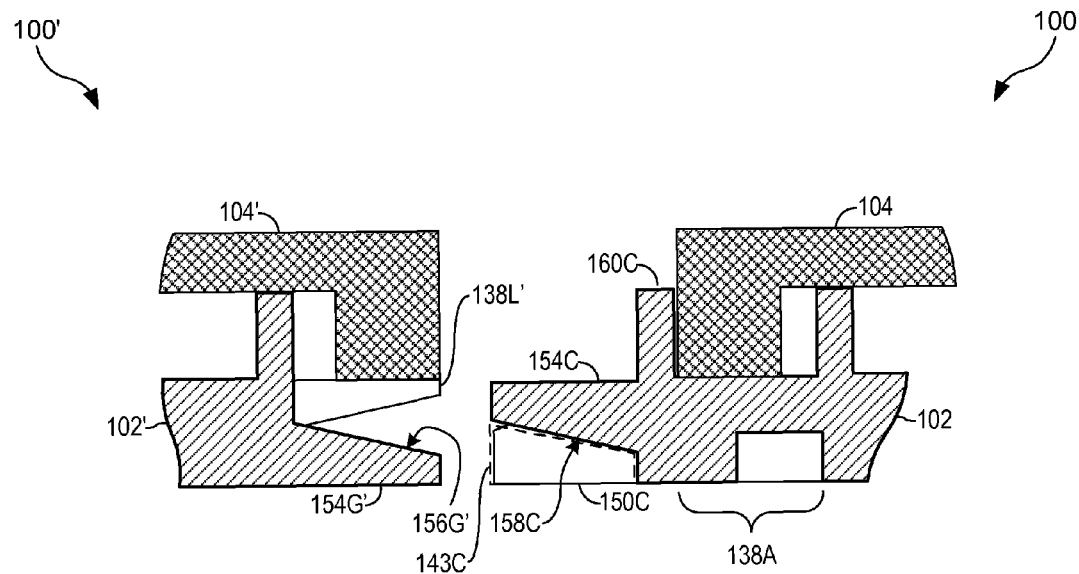
FIGS. 10A-10B are cross-sectional views of interlocking elements.
Figure 10B:
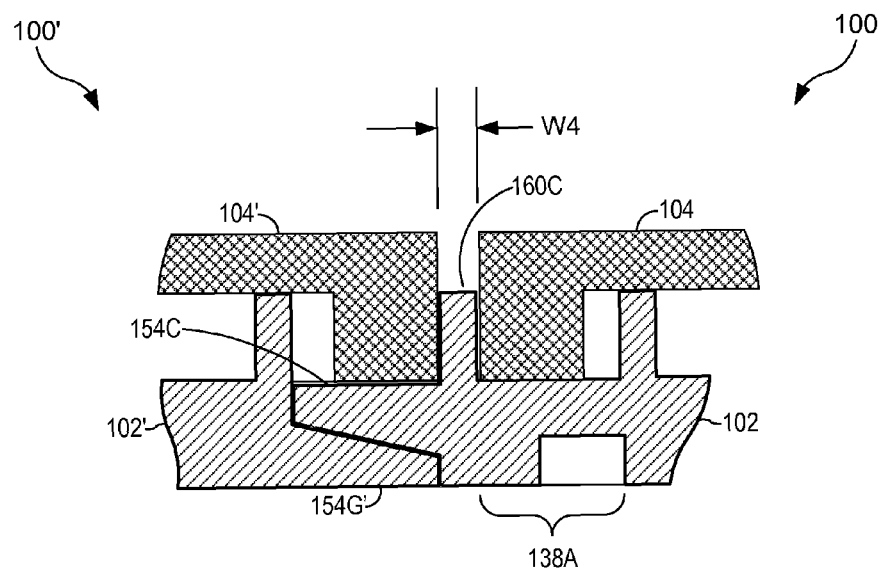

Turning now to FIG. 10A-10B, a sectional view taken along the lines 10-10 in FIG. 8 depicts mounting flanges 150C and interlocking tab 154C of first tile unit 100 adjacent to interlocking tab 154G' and interlocking support flange 138L' of second tile unit 100'. The cross-sectional view is taken through interlocking tab 154C and interlocking tab 154G', and depicts interlocking tab 154G' having an upper surface 156G' that slopes downward as the interlocking tab 154G' extends outwardly from base plate 102'. Interlocking tab 154C has a lower surface 158C that slopes upwardly as the interlocking tab 154C extends outwardly from base plate 102. A volume 143C below interlocking tab 154C is open to accommodate interlocking tab 154G' beneath interlocking tab 154C as tile unit 100' is aligned adjacent to tile unit 100. Similarly, interlocking support flange 138L of tile unit 100' has a lower surface that slopes upwardly as the interlocking support flange 138L extends outwardly from base plate 102', and mounting flange 150C of tile unit 100 has an upper surface that slopes downwardly as the mounting flange 150C extends outwardly from base plate 102'. As shown in FIG. 10B, tile unit 100' having surface material tile cap 104' atop base plate 102' can be positioned adjacent to and substantially in contact with tile unit 100 having surface material tile cap 104 atop base plate 102, such that interlocking support flange 138L' of base plate 102' can fit over mounting flange 150C of base plate 102, thereby concealing any fastener installed through mounting hole 152C, and interlocking flange 154C of base plate 102 can fit over interlocking flange 154G' of base plate 102', thereby securing side C of tile unit 100' to side A of tile unit 100. A spacer 160C formed integrally in base plate 102 extends upwardly from a location beyond the extent of surface material tile cap 104 and between support flange 138A and mounting flange 150C. The spacer 160 effectively limits the proximity of surface material tile cap 104' to surface material tile cap 104 in the manner described above. A drainage gap having a width W4 can be maintained between the surface material tile caps 104, 104' of adjacent tile units 100, 100' to permit water or other liquids to drain between adjacent tile caps.

Adhesive Mounting (Glue Cups)

Figure 11:
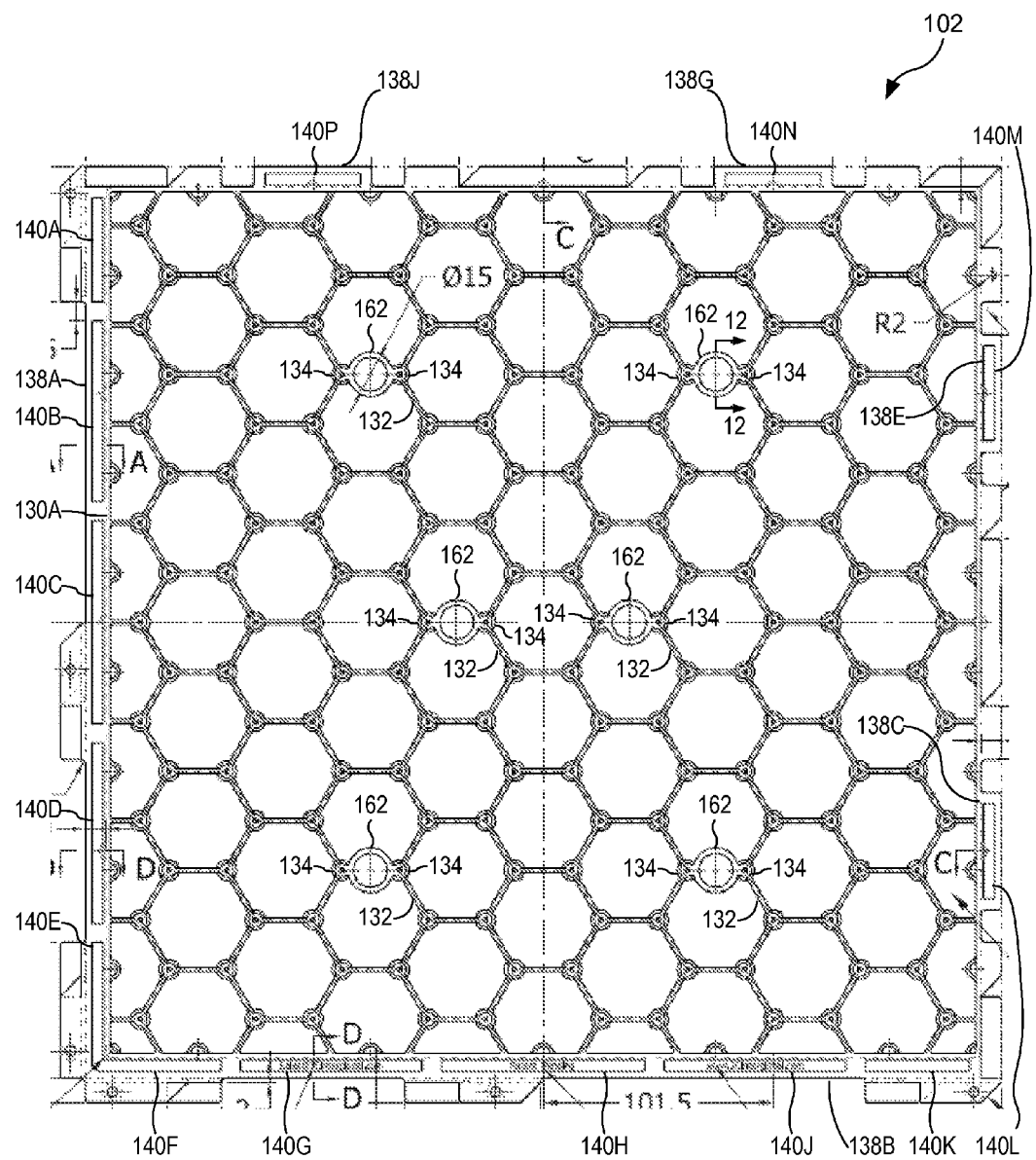
FIG. 11 is a bottom plan view of a base plate embodying features of an exemplary embodiment.

Turning now to FIG. 11, a bottom plan view of an exemplary base plate 102 depicts additional features of the tile unit 100. Conventional tile panel units have traditionally been held in place using a suitable adhesive. In the event one desires to use an adhesive material to secure an embodiment of the tile panel unit 100 of the present invention, the base plate 102 provides receptacles and receptive channels for receiving a construction-grade adhesive as an alternative to using screw-type fasteners through mounting holes 152 in the mounting flanges 150. Within peripheral walls 130, a matrix of structural reinforcing shapes is shown as a matrix of hexagonal shapes, although other shapes may be used as desired, and within that matrix are a number of adhesive receptacles or "glue cups" 162. The adhesive receptacles 162 can be located between any two vertical column segments 134 in place of a vertical wall segment 132. As shown in FIG. 11, six adhesive receptacles 162 are shown interspersed among the matrix of structural reinforcing shapes. Each of the adhesive receptacles 162 and be a circular vessel open at the bottom thereof for receiving a construction-grade adhesive of sufficient quantity to fill the adhesive receptacle 162. Additionally or alternatively, a number of adhesive-receiving channels 140 can be formed in peripheral features of the base plate 102. For example, adhesive-receiving channels 140A-140E can be formed in various locations along the underside of support flange 138A, and adhesive-receiving channels 140F-140K can be formed in various locations along the underside of support flange 138B. Additionally, adhesive-receiving channels 140L and 140M can be formed in the underside of support flanges 138C and 138E, respectively. Adhesive-receiving channels 140N and 140P can be formed in the underside of support flanges 138G and 138J, respectively. The adhesive receptacles 162 and the adhesive-receiving channels 140 can be filled with a construction-grade adhesive during installation, and the tile unit can then be installed in a desired location, utilizing the interlocking elements for proper alignment as described above, and permitted to sit in-place until the adhesive sets and/or cures.

Figure 12:
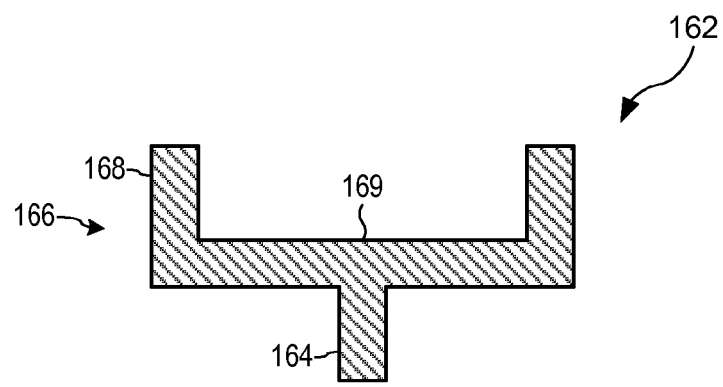
FIG. 12 is a cross-sectional view of an adhesive receptacle of the base plate.

Turning now to FIG. 12, a exemplary adhesive receptacle 162, or glue cup, is depicted in cross-section showing a vestigial vertical wall segment 164 supporting a circular cup 166, comprising a cylindrical wall 168 enclosing a circular surface 169. The cup 166 can be filled with an adhesive while the corresponding tile unit 100 is inverted. The adhesive is preferably thick enough to remain in the cup long enough for the tile unit 100 to be flipped over into a upright orientation and laid onto the floor, or turned to a vertical orientation to be affixed to a wall.

Reinforcing Elements (I-Beams)

Figure 13:
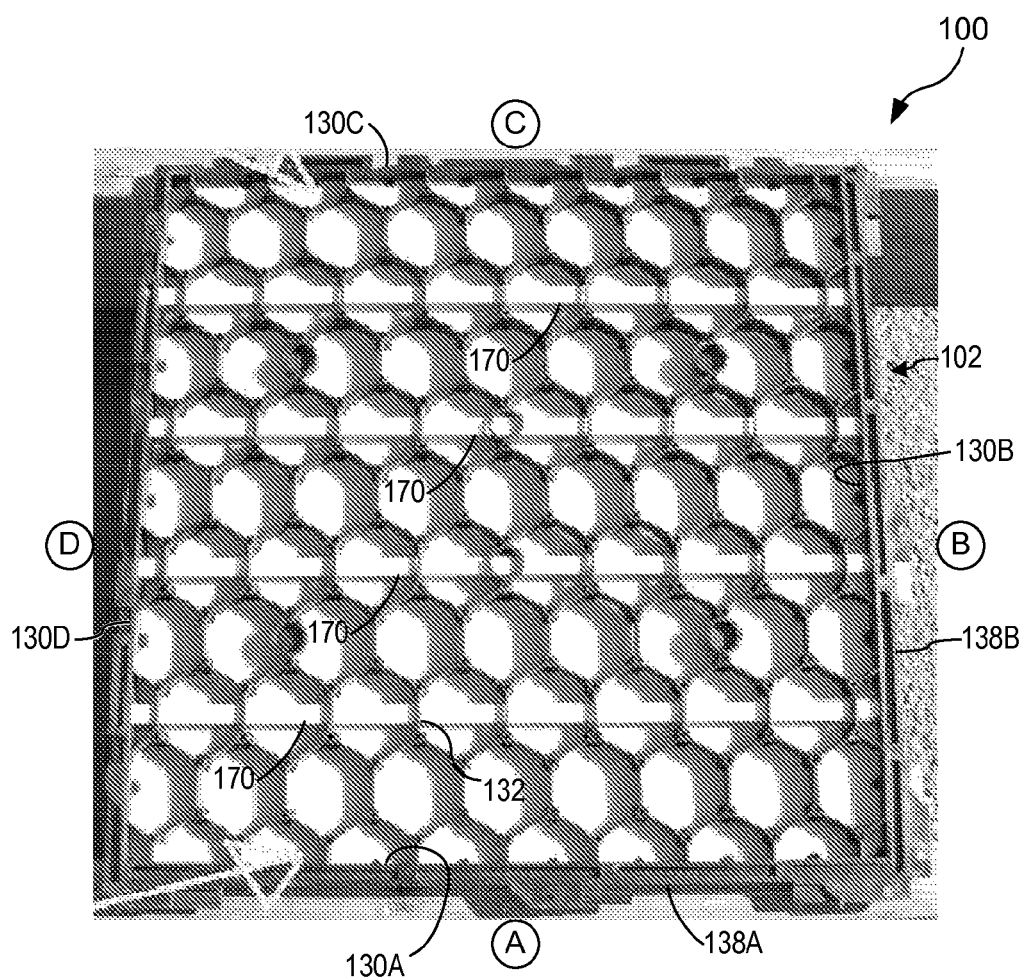
FIG. 13 is a perspective view of the underside of a tile panel unit embodying features of an exemplary embodiment.

Turning now to FIG. 13, an embodiment of the tile unit 100 can have a number of additional reinforcing elements 170 molded into the base plate 102. For example, reinforcing elements 170 can comprise substantially rigid elongated members having a particular cross-section such as an I-beam or a U-channel. In an embodiment, the reinforcing elements 170 can be pultruded fiberglass I-beams. In another embodiment, the reinforcing elements 170 can be steel I-beams or U-channel members. The reinforcing members can be placed into an injection mold in which the base plate 102 is formed, after which the plastic material is injected into the mold thereby capturing the reinforcing members 170 directly into the matrix of reinforcing shapes of the base plate 102. The reinforcing members can be positioned as desired for the reinforcing strength desired and are shown, for example, as passing through a series of vertical wall segments 132 and extending a length of the base plate 102 between side B and side D of the base plate 102. As shown in an exemplary embodiment in FIG. 13, four reinforcing members 170 extend from support flange 138B at side B of the base plate 102 to peripheral wall 130D at side D of the base plate 102, and are substantially equally spaced between support flange 138A at side A of the base plate 102 and peripheral wall 130C at side C of the base plate 102. Additional reinforcing members 170 can be included adjacent to peripheral wall 130A at side of base plate 102 and adjacent to peripheral wall 130C at side C of base plate 102. Additional reinforcing members 170 can be included at other locations as desired and in different orientations according to particular structural requirements. The reinforcing members 170 can also be incorporated into alternative embodiments of base plate 102 having a greater top-to-bottom thickness for increased structural strength.

Offset Alignment and Patterns

Figure 14:
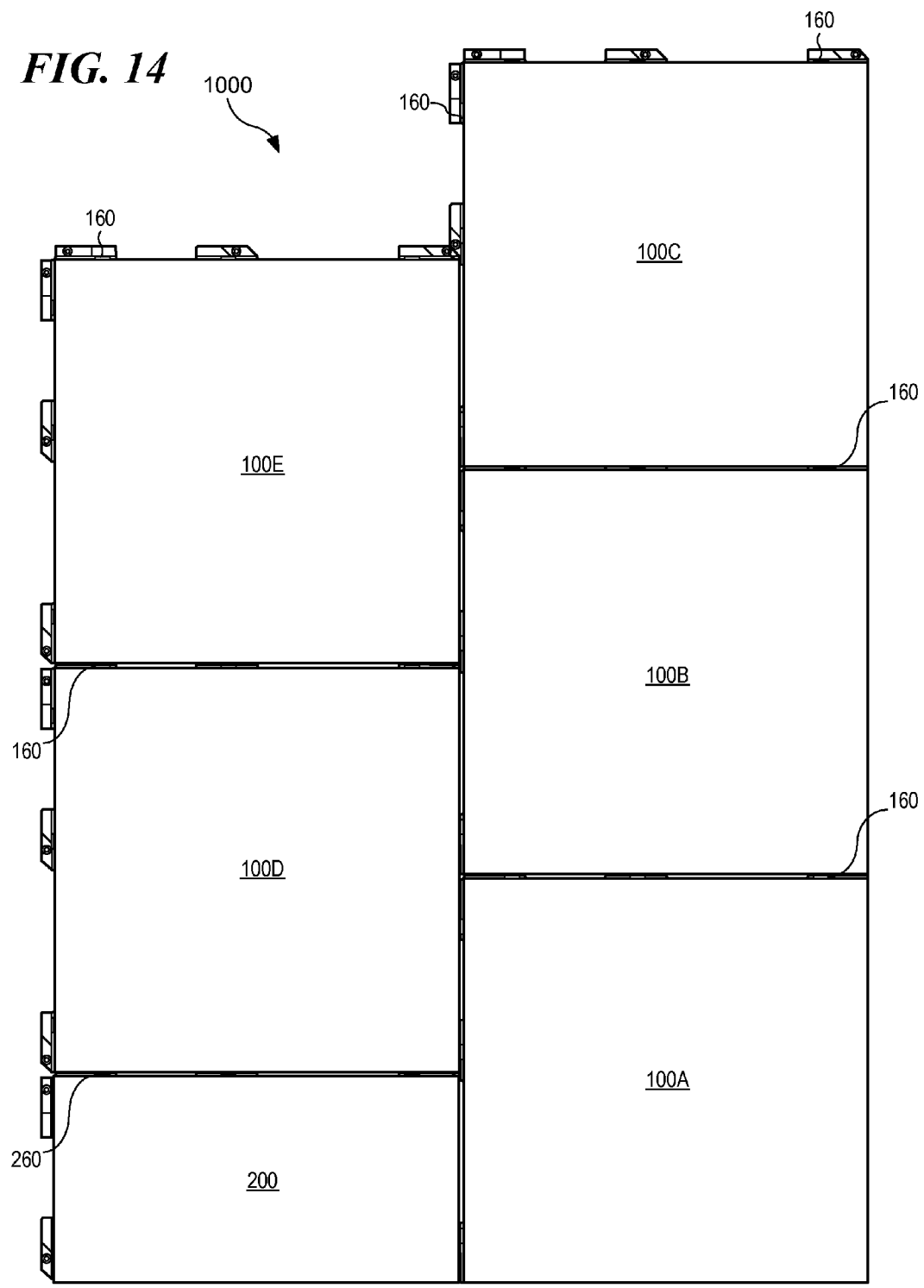
FIG. 14 is a plan view of a tile assembly system depicting a particular arrangement of tiles.

Turning now to FIG. 14, the reference numeral 1000 generally indicates a portion of a tile assembly system comprising one or more tile units 100. A first tile unit 100A can be installed in a corner of a desired floor or wall covering pattern, aligning side C and side D thereof, having no mounting flanges along those sides, in the corner of the area to be tiled. A second tile unit 100B can be installed adjacent to and aligned with first tile unit 100A. A third tile unit 100C can be installed adjacent to and aligned with second tile unit 100B, and forming a first row of tile units comprising tile units 100A, 100B and 100C. Starting a second row of tile units 100, a fourth tile unit 100D can be installed adjacent to and offset from first tile unit 100A so that approximately half of fourth tile unit 100D is adjacent to second tile unit 100B. A fifth tile unit 100E can be installed adjacent to and offset from second tile unit 100B so that approximately half of fifth tile unit 100E is adjacent to third tile unit 100C. A space adjacent to first tile unit 100A that is not covered by the offset fourth tile unit 100D can be covered by a variant embodiment of the tile panel units of the present invention, for example, a half-size tile unit 200 having features similar to the tile units 100 but having only one-half the length along side A/side C thereof. Throughout the area to be tiled, drainage gaps can be maintained between adjacent tile units 100, 200, by spacers 160 of the tile units 100 and corresponding spacers 260 of tile unit(s) 200.

Figure 15:
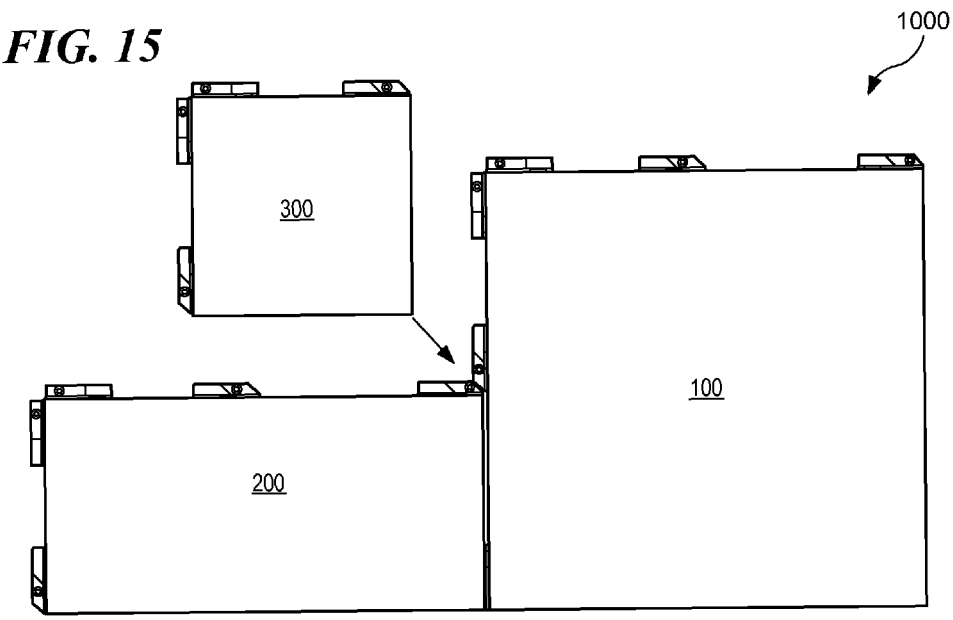
FIG. 15 is a plan view of a tile assembly system depicting another arrangement of tiles.
Figure 16:
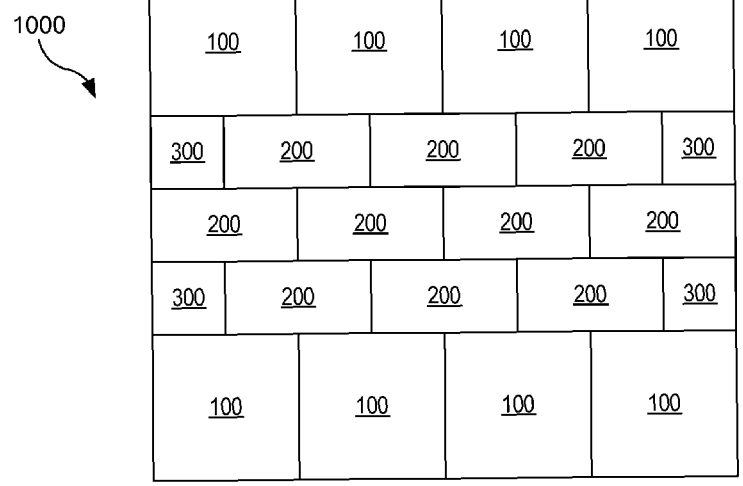
FIG. 16 is a plan view of a tile assembly system depicting yet another arrangement of tiles.
Figures 17, 18:
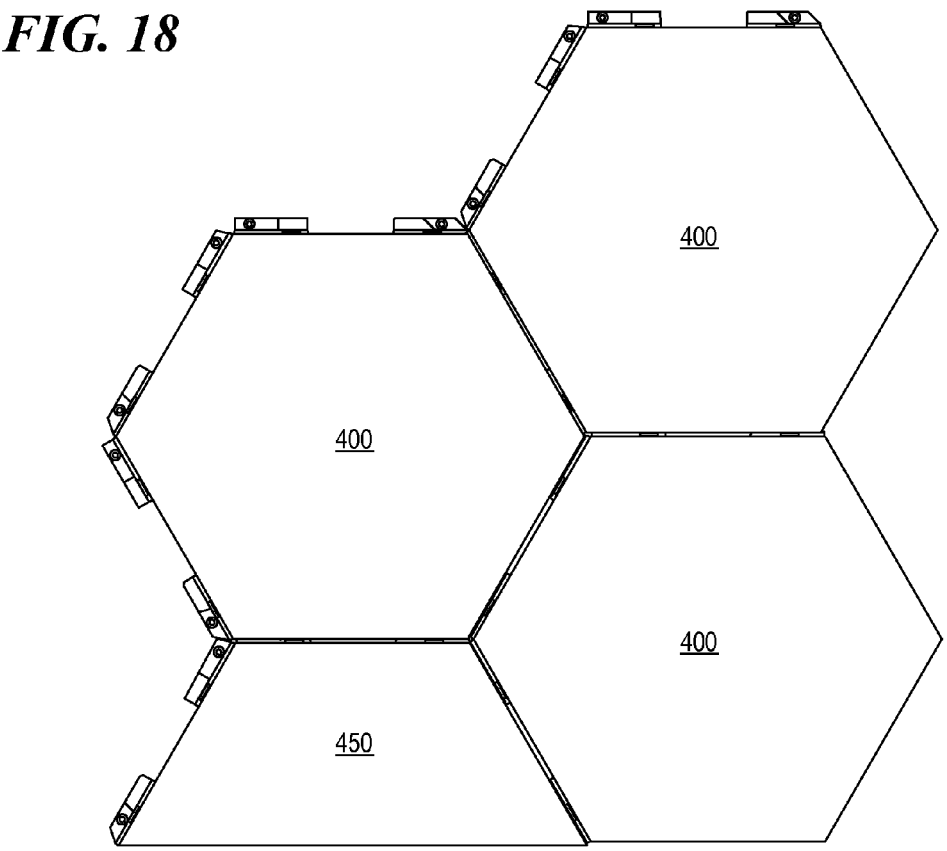
FIG. 17 is a plan view of a tile assembly system depicting another arrangement of tiles.
FIG. 18 is a plan view of a tile assembly system depicting another arrangement of tiles.

Turning now to FIG. 15, a portion of an exemplary tile assembly system 1000 is depicting comprising a first, full-size tile unit 100 adjacent to a second, half-size tile unit 200. A third, quarter-size tile unit 300 can be installed adjacent to and in the corner formed by first tile unit 100 and second tile unit 200. The quarter-sized tile unit 300 has features similar to tile unit 100 but having only one-half the length along side A/side C and along side B/side D thereof. As shown for example in FIG. 16, different patterns, such as ashlar patterns and the like, can be created in the tile assembly system using tile panel units 100, 200, 300 of different sizes, while retaining the advantageous features of the tile panel units 100. As another example, FIG. 17 depicts an ashlar pattern created using rectangular tile units 200. As another example, FIG. 18 depicts a pattern created using hexagonal tile units 400 and at least one half-hexagon tile unit 450.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A tile panel unit, comprising:
 a first part comprising a tile cap having a shape and comprising a composite of crushed stone mixed with a resin and a catalyst; and
 a second part formed separately from the first part, the second part comprising a base plate at least partially embedded in at least a portion of an underside of the tile cap, and the base plate at least partially extending downwardly beyond the underside of the tile cap to form one or more support surfaces of the tile panel unit, wherein the base plate further comprises:
  a peripheral structure approximating the shape of the tile cap; and
  an openwork matrix of structural reinforcing shapes disposed within the peripheral structure.

2. The tile panel unit of claim 1, wherein the structural reinforcing shapes comprise a number of vertical wall segments arranged in a pattern of intersecting wall segments.

3. The tile panel unit of claim 2, further comprising vertical column segments at each intersection of any two vertical wall segments.

4. The tile panel unit of claim 3, wherein the vertical column segments further comprise a circular boss at a top end thereof.

5. The tile panel unit of claim 3, wherein the vertical column segments further comprise a bore formed through the center thereof.

6. The tile panel unit of claim 4, wherein the circular bosses are encapsulated in at least one layer of the tile cap.

7. The tile panel unit of claim 5, wherein the bores through the vertical column segments are partially filled with at least one layer of material forming the tile cap.

8. The tile panel unit of claim 1, wherein the structural reinforcing shapes are hexagons.

9. The tile panel unit of claim 1, wherein the base plate further comprises one or more mounting elements extending outwardly from the peripheral structure.

10. The tile panel unit of claim 9, wherein the mounting elements comprise tabs each having a hole formed therethrough for receiving a mechanical fastener.

11. The tile panel unit of claim 1, wherein the base plate further comprises one or more interlocking elements extending outwardly from the peripheral structure.

12. The tile panel unit of claim 11, wherein the interlocking elements comprise at least one first tab extending outwardly from the peripheral structure at a height above a bottom of the base plate sufficient to fit over a mounting element of an adjacent tile panel unit.

13. The tile panel unit of claim 12, further comprising at least one second tab extending outwardly from the peripheral structure at a height above the bottom of the base plate for fitting under an interlocking element of an adjacent tile panel unit.

14. The tile panel unit of claim 1, wherein the base plate further comprises spacers extending upwardly from a periphery of the base plate beyond an extent of the tile cap for limiting the proximity of adjacent tile caps.

15. The tile panel unit of claim 14, wherein the spacers are co-located with mounting elements extending outwardly from the peripheral structure.

16. The tile panel unit of claim 1, wherein the base plate further comprises reinforcing elements embedded within the molded base plate.

17. The tile panel unit of claim 16, wherein the reinforcing elements comprising pultruded fibreglass beams having a particular cross-sectional shape.

18. The tile panel unit of claim 16, wherein the reinforcing elements comprise metal beams having a particular cross-sectional shape.

19. The tile panel unit of claim 1, wherein the base plate further comprises one or more adhesive receptacles for receiving a construction adhesive from an underside of the base plate.

20. The tile panel unit of claim 19, wherein the one or more adhesive receptacles are molded into the matrix of structural reinforcing shapes.

21. The tile panel unit of claim 19, wherein the one or more adhesive receptacles are molded into an underside of the peripheral structure.

22. The tile panel unit of claim 19, further comprising one or more supporting elements extending outwardly from the peripheral structure and supporting a peripheral edge of the tile cap, and wherein the one or more adhesive receptacles are molded into an underside of the supporting elements extending outwardly from the peripheral structure.

23. The tile panel unit of claim 19, wherein the one or more adhesive receptacles are molded into an underside of mounting elements extending outwardly from the peripheral structure.

24. The tile panel unit of claim 1, wherein the base plate is coupled to the tile cap.

25. The tile panel unit of claim 1, wherein at least a portion of the base plate is at least partially embedded in the first layer only of an underside of the tile cap.

26. The tile panel unit of claim 1, wherein at least a portion of the base plate is embedded in uncured resin forming at least a portion of an underside of the tile cap.

27. The tile panel unit of claim 1, wherein at least a portion of the base plate is embedded in a resin prior to complete curing of the resin, the base plate forming at least a portion of an underside of the tile cap.

28. The tile panel unit of claim 1, wherein the tile cap is formed separately from the second part.

29. The tile panel unit of claim 1, wherein the matrix of structural reinforcing shapes comprises open structural reinforcing shapes.

\* \* \* \* \*